Nov. 27, 1928.
B. D. COLGROVE
1,693,192
AUTOMOBILE TIRE RIM
Filed July 15, 1925
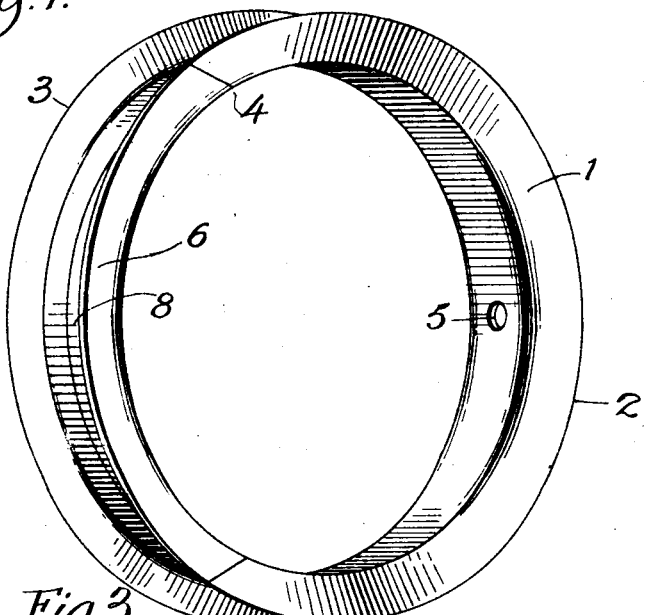
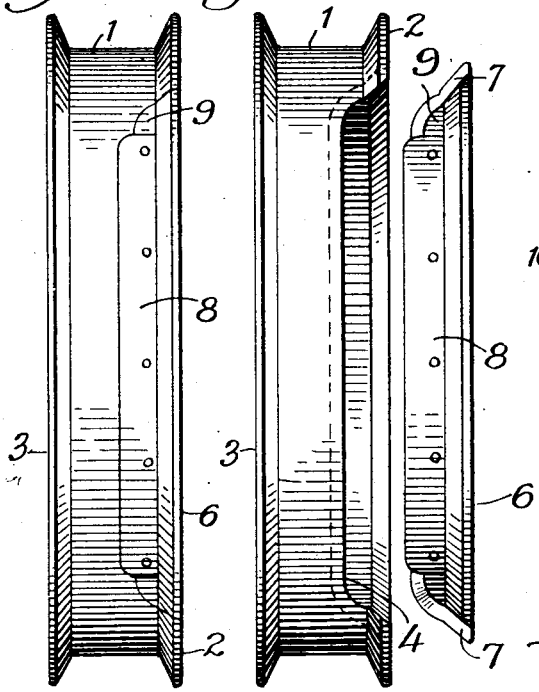
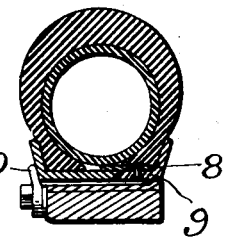
Inventor,
B. D. Colgrove,
By Lloyd W. Patch
Attorney Patented Nov. 27, 1928.

1,693,192

UNITED STATES PATENT OFFICE.

BERT D. COLGROVE, OF DENVER, COLORADO.

AUTOMOBILE TIRE RIM.

Application filed July 15, 1925. Serial No. 43,816.

This invention relates to automobile tire rims, and particularly to a sectional rim adapted for use with pneumatic tires to facilitate the mounting and removal of the tire.

An object of my invention is to provide a sectional rim with which the parts are automatically locked and released when the rim is mounted upon and removed from a wheel.

A further object resides in so constructing the parts that the tire retains the parts of the rim in place, and mechanical securing means is not required.

A still further object is to provide a sectional rim of such construction that the sectional portions thereof interfit to provide a smooth and substantially continuous channel to receive the tire casing, and that no joint or other break in the rim is presented to pinch the tube or injure the structure of either the tube or the casing.

With the above and other objects in view, which will be apparent to those skilled in the art, this invention includes certain novel features and constructions and combinations of parts which will now be set forth in connection with the drawing.

In the drawing:

Figure 1 is a view in perspective taken from the inner side of a rim constructed in accordance with my invention.

Fig. 2 is an edge view with the removable section of the rim in place.

Fig. 3 is a view similar to Fig. 2 showing the section removed.

Fig. 4 is a transverse sectional view through a tire and wheel felloe with my rim applied thereto.

The main portion 1 of the rim is of substantially standard form and construction, and this rim structure can be made up to take a clincher tire or a straight-side casing, the inner and outer flanges 2 and 3 being provided to hold the tire casing in place.

The rim 1 has the inner flange 2 thereof cut away at 4 for substantially one-third of its periphery, preferably at a point opposite the valve stem opening 5. This cut 4 is extended into the main portion of the rim for a slight distance, as better shown in Fig. 3, the cutting of the body portion of the rim being preferably cut only about one-third of its total width so that the middle portion of the body of the rim will present a smooth and unbroken surface and will not injure the tube and casing fitted thereon. It is preferable that the flange 2 and the body of the rim be beveled or rabbeted on the inner side of the rim so that the opening 4 will have a substantially dove-tailed shape.

A rim section 6 is provided to be fitted within the opening 4 and has its edge 7 beveled to conform with the beveled edge of the opening so that the section 6 will fit within the opening and form a substantially continuous rim structure. A retaining plate 8 is riveted or otherwise secured upon the outer side of the body portion 9 of the rim section 6, and is stopped short of the ends thereof. This plate 8 conforms to the body 8 of the section 6 and consequently will overlap upon the body of the rim 1 so that the rim section 6 is retained against displacement into the circle of the rim but is free to be withdrawn from the opening 4 by movement substantially circular with the axis of the rim.

In the use of my rim the section 6 is removed and the tire casing and tube are fitted upon the rim 1 in the usual manner, the gap in the side flange 2 permitting radially mounting of the casing. The rim section 6 is then fitted in place with the beveled edge 7 against the beveled edge of the opening 4 and the retaining plate 8 inserted between the body of the rim 1 and the casing. The rim is fitted upon the wheel felloe with the flange 2 on the inner side and the usual clips 10 are tightened into place to retain the rim upon the wheel. The rim section 6 is positively locked and held in place when the rim is fitted upon the wheel and is entirely free and unsecured when the rim is removed from the wheel so that the section can then be removed without the necessity of loosening nuts, bolts, or other fastenings.

While I have herein shown and described only certain specific embodiments of my invention and have suggested only certain possible modifications, it will be appreciated that changes and variations can be made in the form, construction, and assembly of the parts without departing from the spirit and scope of my invention.

I claim:

An automobile tire rim comprising a rim member provided with side flanges and having the flange at one side cut away for considerable distances around the periphery of the rim, and a removable rim section shaped to fit within the opening of the main rim and complete the flange thereof, said rim and removable section being formed to be substantially dovetail-shaped on their adjacent edges to interfit to hold the removable section against displacement radially with respect to the main rim portion, and a retaining plate carried by the removable section engaging between a tire and the body of the rim to hold the removable section against inward displacement.

In testimony whereof I hereunto affix my signature.

BERT D. COLGROVE.